No. 12,621. REISSUED MAR. 19, 1907.

A. A. DENNIS.

VENEER GLUING MACHINE.

APPLICATION FILED FEB. 21, 1907.

2 SHEETS—SHEET 1.

Witnesses:

A. C. Denison.

Mary S. Tooker

Inventor:

Alfred A. Dennis by Edmund Taggart, his Atty.

No. 12,621. REISSUED MAR. 19, 1907.

A. A. DENNIS.

VENEER GLUING MACHINE.

APPLICATION FILED FEB. 21, 1907.

2 SHEETS—SHEET 2.

Witnesses:

A. C. Denison.

Mary S. Tooker

Inventor:

Alfred A. Dennis by Edmund Taggart, his atty.

UNITED STATES PATENT OFFICE.

ALFRED A. DENNIS, OF GRAND RAPIDS, MICHIGAN, ASSIGNOR OF ONE-HALF TO ROYAL FURNITURE COMPANY, OF GRAND RAPIDS, MICHIGAN, A CORPORATION.

VENEER-GLUING MACHINE.

No. 12,621. Specification of Reissued Letters Patent. Reissued Mar. 19, 1907.

Original No. 838,089, dated December 11, 1906. Application for reissue filed February 21, 1907. Serial No. 358,751.

*To all whom it may concern:*

Be it known that I, ALFRED A. DENNIS, a citizen of the United States, residing at Grand Rapids, in the county of Kent and State of Michigan, have invented new and useful Improvements in Veneer-Gluing Machines, of which the following is a specification.

This invention relates to certain new and useful improvements in veneer-gluing machines; and its object is to provide a machine which will automatically attach together, edge to edge, strips or pieces of veneer, so that each piece will constitute a part of a larger sheet.

It is designed especially to be used in connection with fine veneers for surfacing furniture where continuous sheets of satisfactory size and grain cannot be had and to utilize what otherwise would be waste pieces of such veneer.

These objects I accomplish by means of the mechanism shown in the accompanying drawings, in which—

Figure 1:
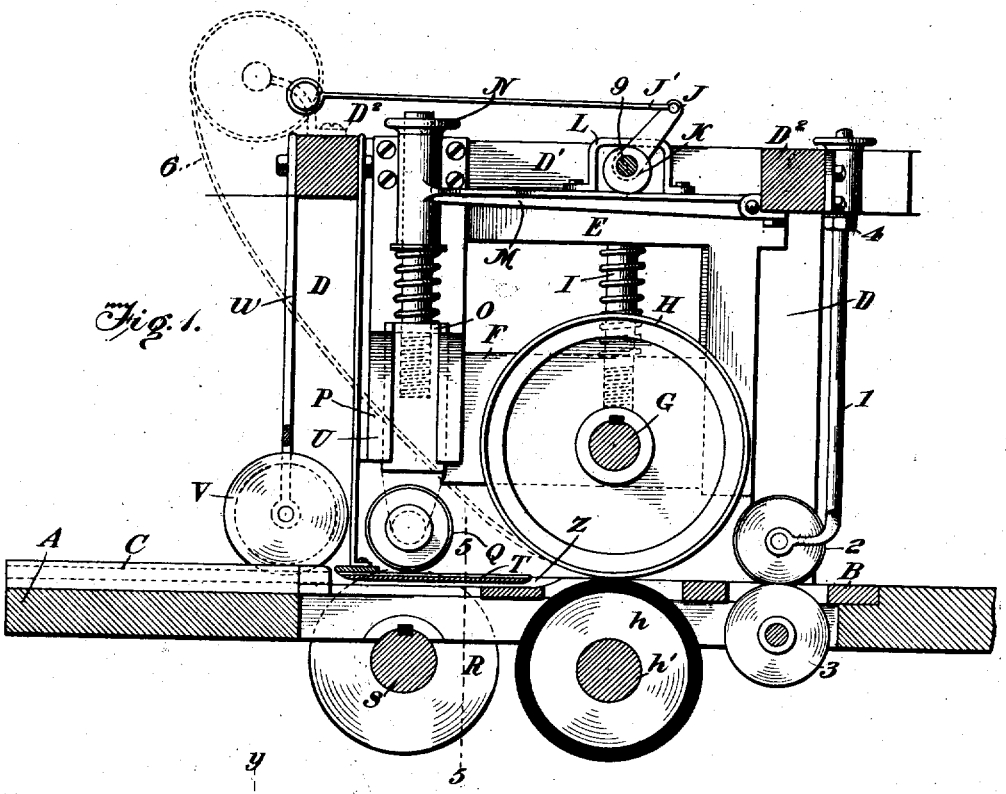
Figure 2:
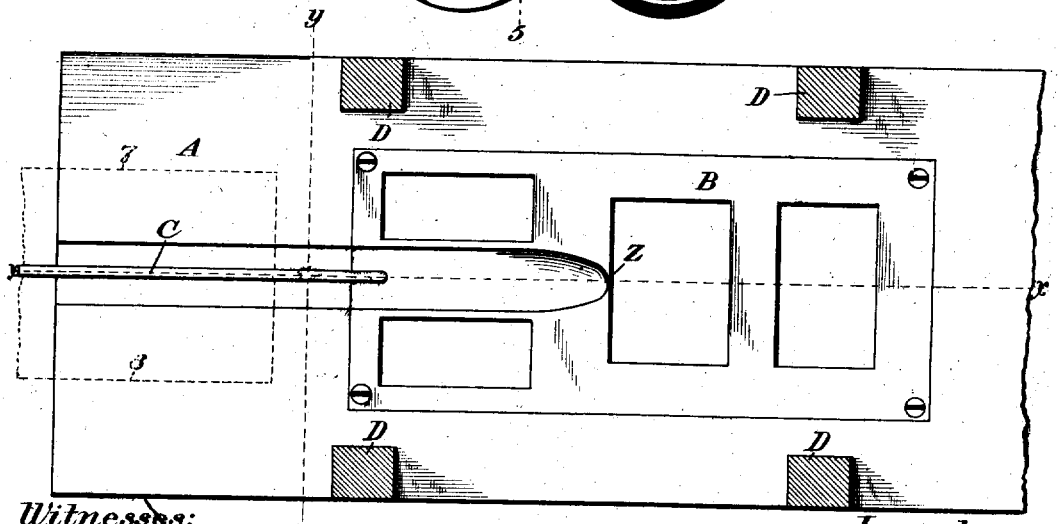
Figure 3:
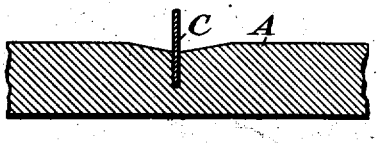
Figure 4:
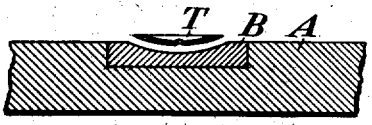
Figure 5:
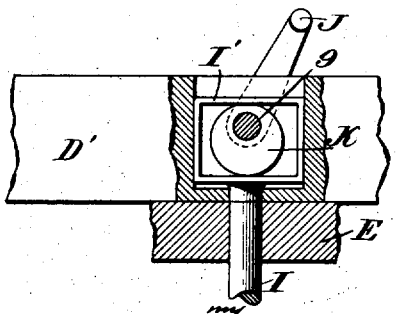
Figure 6:
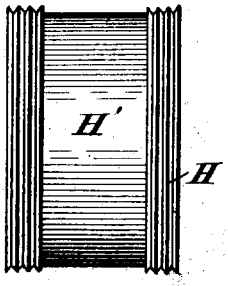
Figure 7:
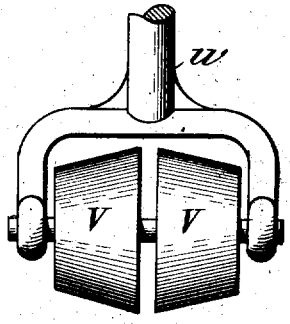
Figure 8:
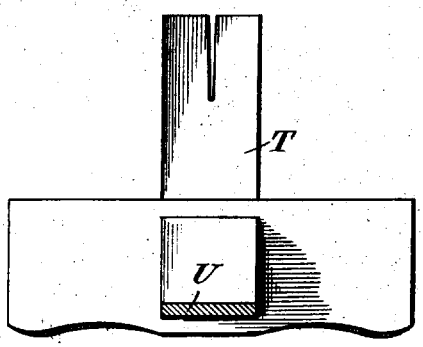
Figure 9:
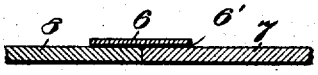

Figure 1 is a vertical section of the machine on line *x x* of Fig. 2, showing also in projection all the parts beyond the plane of the section. Fig. 2 is a top plan view of the main bed or table. Fig. 3 is a broken portion of a vertical cross-section on line *y y* of Fig. 2. Fig. 4 is a broken portion of a vertical cross-section of the main bed and adjacent parts on line 5 5 of Fig. 1. Fig. 5 is a detail section showing the method of vertically operating the rod I. Fig. 6 shows in detail the pressure-roller which attaches the adhesive tape. Fig. 7 is a detail perspective of a pressure-roller used to aid in properly feeding the veneer strips. Fig. 8 is a top plan of the same parts shown in Fig. 4, and Fig. 9 is a section showing the veneer strips and attaching-tape.

For the purpose of attaching the two strips together edge to edge I use a prepared adhesive tape, made of cloth, paper, or any suitable material, which is fed from any suitable drum or roll, as indicated by the numeral 6 and by the dotted lines in Fig. 1. This prepared tape is coated with an adhesive substance of such composition that when cold it will not adhere or will adhere only slightly, so that it may be uncoiled from a reel, and such that immediately upon the application of heat it becomes highly adhesive, and by the application of a sufficient degree of heat becomes very firmly and strongly set and attached to any surface in contact with it. I do not describe this tape or its composition more in detail, intending to make my improved form of the same the subject of a separate application. It is sufficient to say that the same is of the type which is affected by heat, like the well-known surgeon's adhesive plaster. This tape may be as broad or as narrow as desired; but in practice I have found it desirable to make the same about one inch in width. By this method I avoid any necessity for distributing a hot adhesive liquid-like glue upon the face of the fabric or tape and avoid also the necessity of a long continued dry heat for setting the glue, thus omitting the parts of the mechainsm which otherwise must be devoted to these purposes.

A represents the main bed-frame or table of the machine provided with suitable openings, as shown in Fig. 2, to permit the various pressure-rollers and feeding devices to pass therethrough. I have constructed these openings in a metal plate B, which I have inserted in the main bed, as shown in Figs. 1 and 2. Upon the upper surface of the main bed A and running also into the inserted plate B, if such be used, I hollow out a groove-like depression as wide and as deep and of such exact form in cross-section as may be desired. This groove is shown in cross-section in Fig. 3 in its outer portion, being there angular, and is shown in cross-section in its inner portion in Fig. 4, being there concave. At its inner end and at or near the point where the tape-attaching roller makes contact with the veneer strip this groove gradually runs out into the plane of the surface of the bed, as shown by Z in Figs. 1 and 2.

C (shown in Figs. 2 and 3 and indicated by dotted lines in Fig. 1) is a vertical plate at the bottom of this groove extending toward its inner end, but terminating somewhat short thereof and serving as a partition between the two longitudinal halves of the groove.

D D D D are the four corner-posts of the frame suitably attached to the main bed and rising therefrom and supporting and carrying other parts of the machine. These posts are connected at the top in one direction by the cross-bars D′ and in the other direction by the cross-bars $D^2$. Sliding vertically in the cross-bars D′ and other portions of the frame are the rods I I, one at each side of the machine. These rods carry at their lower end the horizontal power-shaft G, to which positive motion is imparted by any suitable means, and through these rods I I this shaft G and the roller which it carries may be raised or lowered.

A suitable tension-spring may be used, as shown in Fig. 1, to give an elastic pressure to the roller H, which is the roller carried and operated by the shaft G. This roller H may have its surface in any suitable form; but I have found the form shown by Fig. 6 especially desirable. This has a surface H′ as great as or greater than the width of the tape to be attached and has at each side of such surface and projecting very slightly beyond the same a corrugated portion.

It is apparent that when the main central portion is pressed down upon the tape with sufficient pressure to attach the same these corrugations will very firmly bite the wood at each side of the tape and will insure the forward motion of the veneer strips in a direct line of travel and without any possible slip or motion laterally or at an angle to such line of travel.

The vertical rods I are operated vertically by the construction shown in Fig. 5. The upper portion of the rod carries an eccentric-guide I′, which I have shown rectangular in form. This contains the eccentric K′, carried on the shaft 9. The shaft is rocked by the lever J, and the lever J is operated or pulled forward by the arm J′. (Shown in Fig. 1.) It is evident that as the arm J′ is pulled forward the eccentric K′ will operate to raise the eccentric-guide I′, and therefore the rod I, and will thus release the pressure upon the veneer strips, while the roller and shaft H G are free to continue their revolving motion. The arm J′ on the lever J and rock-shaft 9 also operate a similar eccentric K, which works in and operates the eccentric-guide L, as shown in Fig. 1. This latter eccentric and guide are attached to the arm M, which is pivoted at its rear end to a suitable portion of the frame and at its forward end carries the vertical rod O. This rod O is provided with a suitable tension-spring and may be further adjusted by the set-screw N above the same. This rod O carries at its lower end the roller Q, which thus exerts a downward and elastic pressure upon the veneer strips. When the shaft 9 is rocked forward, the eccentric K will raise the arm M, and thereby raise the rod O simultaneously with the rod I and release also this pressure upon the veneer strips.

The shaft G is journaled in the vertically-movable box F, which slides upon suitable guides depending from any suitable portion of the frame, (marked and indicated in Fig. 1 by the letter E,) and in a similar way the roller Q, journaled in the lower end of the rod O, is guided in its vertical motion by the guides P. These guides P and the guides upon the frame E are ordinary V-guides in the construction which I have shown.

R is a power-feed roller situated below the table and projecting up therethrough. It is carried on and operated by the shaft S, which in turn is operated by any suitable means.

*h* is a pressure-roller situated below and opposite and normally nearly or quite in contact with the roller H. This roller *h* I find should be elastic in its operation, and I have produced this result in the form of machine shown in the drawings by covering the same with an elastic band. It is carried by the shaft *h′*. The upper surface of this lower pressure-roller is in the plane of the main bed or table and forms practically a portion of such main bed or table, over which the veneer strips are fed.

At the rear portion of the machine are the upper and lower pressure-rollers 2 and 3. (Shown in Fig. 1.) One of these is made adjustable. I have shown the upper one carried by the rod 1, which is vertically adjustable on the frame in any suitable way, as by the adjusting-nut 4. I thus provide the machine with four pairs of pressure-rollers or feed-rollers—namely, the rollers Q and R, of which there are two pairs, the same being duplicated upon each side of the device, and the rollers *h* H and the rollers 2 3. Of these H and R are power-feed rollers. The remainder are idlers. All of them can be furthe provided with such adjustability, frictional surfaces, and elasticity as the special requirements of the work may indicate. The rollers Q and R should especially be provided with such corrugations or other frictional surfaces as will additionally insure the direct forward travel of the strips and prevent any lateral slip and sufficiently resist any tendency to lateral slip or angling motion which may be caused by the crowding of the two strips together as they leave the groove at Z.

W V V is a pressure-roller, or rather a guide operating to hold the two strips of veneer down in the bottom of the groove as they move forward in their direct travel, and it should present upon its lower surface a line of the same formation as the bottom of the groove at that point and be raised above such bottom the thickness of the veneer. I have shown it as being vertically adjustable by means of its carrying-rod W, adjustably attached to the frame. A similar function is performed further along in the groove and toward its rear end by the guide T. This is carried by the vertically-adjustable rod or plate U, adjustably attached to the frame, and this guide extends along over the groove and is upon its under surface of a shape corresponding to the bottom of the groove. It insures that the veneer shall lie smoothly in the groove and in contact with the bottom thereof as the veneer moves forward in the groove.

The operation of the device has been in most respects already sufficiently described. I take two veneer strips (represented by 7 and 8 in Fig. 9) and feed them along the bed or table in such a way that their inner edges pass under the guides V V and are forced down into the bottom of the groove. They are then fed along, being held apart by the partition C and being farther on held down in the groove and in contact with its bottom by the guide T. As they reach about the inner end of the partition C they are seized and fed forward in an absolutely direct and parallel line of travel by the rollers Q R. Just as they reach the rollers H *h* the bottom of the groove rises to the plane of the surface, and the edges of the two strips are therefore brought together, so as to make a tight joint. This can be regulated by changes in the width of the partition C and in the depth of the groove. Thus the edges will be forced together more or less tightly, as may be desired; but the main body of the veneer strips cannot yield laterally. The adhesive tape is then attached in the form shown in Fig. 9, in which 6 represents the tape and 6′ the adhesive material thereon, and the two strips, united so as to be one, pass on between the pressure-rollers 2 3, which serve as additional guides to cause direct travel and also in some measure additionally to attach the tape, and they are then delivered at the rear of the machine completely and satisfactorily united. The roller H is intended to be heated. This may be done by a gas-flame introduced into the interior or in any well-known manner, and as the particular method of heating constitutes no part of my invention I have not illustrated the same. When the veneer strips have come through the machine united together as described, they may be turned over and laid with the tape in contact with the body of the wood of which the veneer is to form the face. A layer of glue is interposed between such body and the veneer, and the two are then attached together permanently by veneer-presses or in any well-known manner. A thin tape sinks into the interposed body of glue, and as a result the upper or veneer surface is perfectly plain, and the presence of these fabric strips or tapes cannot be detected, the finishing-surface being as perfect as if no such tapes were underneath. If preferred, the veneer may be attached to the body by glue and veneer-presses in the usual way and with adhesive tapes on the upper surface. These tapes may then be removed, leaving underneath them the perfect veneer-joint which they have assisted to produce, and a perfect surface for a final finishing will thus be presented, such adhesive material as remains upon the veneer being easily removed.

I have described a groove of concavity in the table-body for the purpose of bringing about tighter contact between the edges of the veneer strips. It is obvious that the same result would be produced by a convexity, or what would be equivalent to an inverted groove upon the table-body, or by any other form which would advance the edges of the strips in a plane different from the plane of the main advancing body and would then return the edges to the plane of the main body, and while in the claims I have referred to a "groove," I intend thereby to include such equivalent means of producing the same result.

Having thus described my invention, what I claim to have invented, and desire to secure by Letters Patent of the United States, is—

1. In a machine for attaching veneers edge to edge, a main bed or table having means for disposing two strips of veneer at an angle with respect to the plane of said table, and means for bringing said strips to the plane of said table, pressure and feed rollers for feeding and carrying the veneer strips, means for feeding and applying an adhesive tape to the adjacent portions of the two veneer strips and means for heating the tape so as to make the same adhesive.

2. In a machine for attaching veneers edge to edge, a main bed or table having means for disposing two strips of veneer at an angle with respect to the plane of said table, and means for bringing said strips to the plane of said table, pressure and feed rollers for feeding and carrying the veneer strips, means for feeding an adhesive tape to the adjacent portions of the two strips and a heated pressure-roller for applying the tape to the two strips of veneer and for heating the tape so as to make the same adhesive.

3. In a machine for attaching veneers edge to edge, a main bed or table having a groove for a portion of the length thereof for receiving and holding at an angle to the plane of the table the adjacent parts of two strips of veneer, and without such groove for another portion of the length thereof, pressure and feed rollers for feeding and carrying the veneer strips, and means for applying to the adjacent portions of the two strips of veneer an adhesive tape.

4. In a machine for attaching veneers edge to edge, a main bed or table having a groove for a portion of the length thereof for receiving and holding at an angle to the plane of the table the adjacent parts of two strips of veneer, and without such groove for another portion of the length thereof, a longitudinal partition in such groove for separating the adjacent veneer edges, feed and pressure rollers for feeding and carrying veneer strips, and means for applying an adhesive tape to the adjacent portions of the two veneer strips.

5. In a machine for attaching veneers edge to edge, a main bed or table having a groove for a portion of the length thereof for receiving and holding at an angle to the plane of the table the adjacent parts of two strips of veneer, and without such groove for another portion of the length thereof, means for retaining the veneer strips in contact with the bottom of the groove as they move along the same, feed and pressure rollers for feeding and carrying the veneer strips, and means for applying an adhesive tape to the adjacent portions of the two veneer strips.

6. In a machine for attaching veneers edge to edge, a main bed or table, pressure and feed rollers for feeding and carrying the veneer strips, means for feeding an adhesive tape to its point of attachment, and a roller for applying the tape to the adjacent portions of the two strips of veneer and provided near its opposite ends with flange extensions guiding the tape passing between the same and making contact with the veneer strips beyond the edges of the tape.

7. In a machine for attaching veneers edge to edge, a main bed or table having a groove for a portion of the length thereof for receiving and holding at an angle to the plane of the table the adjacent edges of two strips of veneer, and without such groove for another portion of the length thereof, means for holding the adjacent portions of the veneer strips out of the plane of the table as they are moved along such groove, pressure and feed rollers for carrying and feeding the veneer strips, and means for applying an adhesive tape to the adjacent portions of the veneer strips.

8. A machine of the class set forth having a bed or table provided with means for holding two veneer strips as they are fed over a portion thereof at an angle to the plane of said table and with means for returning said strips to the plane of said table, and also provided with a flat portion over which the strips are fed after being returned to the plane thereof, means for feeding said strips and means for applying to the adjacent portions of said strips an adhesive tape.

9. In a machine of the class described, a bed or table having means for holding two veneer strips at an angle to the plane thereof, and also provided with a flat portion over which the strips are disposed in the plane thereof with their inner edges in close contact, mechanism for feeding and imparting pressure to the strips and applying means for securing the inner edges thereof.

10. In a machine of the class set forth, a bed or table having means for first maintaining two veneer strips at an angle with respect to the plane thereof, and for subsequently disposing said strips in the plane thereof with their inner edges in close contact, and mechanism for feeding and imparting pressure to the said strips and for applying to the adjacent portions thereof means for securing the same together.

In testimony whereof I have hereunto set my hand in presence of two subscribing witnesses.

ALFRED A. DENNIS.

Witnesses:
R. W. IRWIN,
A. C. DENISON.